United States Patent [19]
Foster et al.

[11] 3,873,469

[45] Mar. 25, 1975

[54] SUPPORT COATINGS FOR CATALYSTS

[75] Inventors: Gordon F. Foster, Campbell; Helmuth E. Meissner, Painted Post, both of N.Y.

[73] Assignee: Corning Glass Works, Corning, N.Y.

[22] Filed: Apr. 12, 1972

[21] Appl. No.: 243,417

[52] U.S. Cl............ 252/455 R, 252/460, 252/477 R
[51] Int. Cl.......................... B01j 11/40, B01j 11/32
[58] Field of Search............ 252/463, 477 R, 455 R; 423/213.2, 213.5

[56] References Cited
UNITED STATES PATENTS

| | | | |
|---|---|---|---|
| 2,943,066 | 6/1960 | Arnold et al. | 252/463 |
| 2,968,537 | 1/1961 | Nixon | 252/463 X |
| 3,264,063 | 8/1966 | Carter | 252/463 X |
| 3,498,927 | 3/1970 | Stiles | 252/463 X |
| 3,565,830 | 2/1971 | Keith et al. | 252/466 PT |

*Primary Examiner*—C. Dees
*Attorney, Agent, or Firm*—Kees van der Sterre; Clarence R. Patty, Jr.

[57] ABSTRACT

Catalytic devices employing novel multiple-layer support coatings in combination with known base and noble metal catalysts are described. The devices are generally useful as supported catalyst systems and particularly suitable for use in the treatment of automotive exhaust and other waste gases. The multiple-layer support coatings typically comprise a base oxide layer composed of alumina, silica or mixtures thereof and at least one covering layer of a different composition composed of an oxide selected from the group consisting of silica, titania, zirconia, tin oxide and manganese oxide; these multiple coatings are found to enhance and/or stabilize the activity of known catalysts to a degree not demonstrated by either single-oxide or mixed-oxide support coatings used in the prior art. Also disclosed are novel deposition methods, generally useful in the deposition of the coatings of the present invention, comprising the alkoxide impregnation of a support structure and the subsequent in situ hydrolysis of the alkoxide to form an adherent hydrous oxide coating.

13 Claims, No Drawings

SUPPORT COATINGS FOR CATALYSTS

BACKGROUND OF THE INVENTION

The use of base metal and noble metal catalysts in the treatment of waste gases to reduce the presence of carbon dioxide, unburned hydrocarbons, nitrogen oxides and other catalytically reactive constituents therein is known. Such treatment normally involves contacting the waste gases with a catalytic device which comprises a refractory supporting structure upon which the active catalyst is dispersed. The refractory supporting structure may be composed of refractory metallic, glass or ceramic materials and typically is of a form which is effective to maximize contact between the supported catalyst and the waste gases to be treated. Refractory ceramic supports may suitably be composed of alumina, cordierite, spodumene, petalite, or any other of a wide variety of refractory crystalline or semicrystalline compounds of solid solutions of inert metal oxides such as silica, alumina, magnesia, zirconia, titania, or the like.

Catalytic devices which are to be employed in automotive exhaust emissions control systems should be capable of continuous operation at high space velocities and temperatures perhaps approaching 1,600°F. They must function reasonably well in the presence of water vapor, sulfur impurities, and numerous other substances inimical to the catalytic activity of certain catalysts. Among the base and noble metal catalysts being considered for use in such systems are transition metal oxides, chromites, and ferrites as well as platinum, iridium, palladium rhodium, ruthenium, and mixtures of noble metals.

While the use of the above catalysts in automotive systems is of continuing interest, it has been found that the chemical and thermal stability of such catalysts must be improved if reasonable service life is to be realized. Many catalysts, particularly the noble metal catalysts, are quite sensitive to poisoning by trace amounts of impurities, and in addition most of these catalysts exhibit a decrease in catalytic activity upon prolonged exposure to elevated temperatures. This loss of activity has been attributed to a decrease in the surface area of the catalyst upon heating which may occur as the result of metal migration and catalyst agglomeration. Because of these problems, it has become customary to provide an inert catalyst carrier or support coating on the aforementioned refractory supporting structures. Transition aluminas such as gamma and eta alumina as well as porous silicas have commonly been employed as supports for catalysts, and it has been assumed that the main function of these support materials is to provide good dispersion and high surface area while enhancing the thermal and chemical stability of the catalyst. Nevertheless, the influence of support coating type, composition and method of application on the activity and stability of known catalysts, particularly under the conditions encountered in automotive exhaust systems, has been largely ignored.

Ideally, a catalyst support coating should be refractory enough to withstand the highest temperatures encountered in the automotive exhaust atmosphere, allow optimal dispersion of the catalyst to help prevent excessive grain growth of catalyst particles, and provide a barrier between the catalyst and the refractory support structure to inhibit the migration of poisons into the catalyst. An examination of the crystalline structure and physical and chemical properties of oxides considered for use in catalyst support coatings suggests no clear trends from which the suitability of a particular oxide for use as a catalyst support may be predicted; nor is it possible to relate the effectiveness of support coatings to any one property of the coating, or of the compounds from which it is formed. Thus, while it seems reasonable to assume that a support coating with a higher surface area will give better results in terms of catalytic activity than will a coating with a lower surface area, we have found that the coating with the highest and most stable surface area is not necessarily the best support material for a noble metal catalyst. In fact, it appears that among the most important governing catalytic activity are the methods of preparing the oxides and depositing them on the supporting substate.

It is one object of the present invention to provide novel methods of applying catalytic support coatings to refractory support structures in order to produce coatings which enhance the activity and stability of base and noble metal catalysts supported thereby.

It is a further object of the present invention to provide coating systems of novel configuration which are particularly effective in stabilizing base and noble metal catalysts, particularly for use in automotive exhaust emissions control systems.

It is a further object to provide catalytic devices and methods of manufacturing them which are particularly suited for use in the treatment of automotive exhaust gases to reduce the presence of harmful constituents therein.

Other objects and advantages of the present invention will become apparent from the following and detailed highly-refractory, thereof.

SUMMARY OF THE INVENTION

Briefly, our invention comprises novel support coatings for catalysts and methods for preparing them. The support coatings are intended for use with rigid refractory support structures which are used to support base and noble metal catalysts in order to maximize their efficiency in catalytic treatment processes. The support coatings of the invention are typically composed of alumina, titania, silica, zirconia, tin oxide, and manganese oxide and preferably comprise at least two of the above oxides disposed on the support structure in distinct layers, with the base layer being composed of alumina, silica or mixtures thereof. We have found that these layered support coatings can combine the advantageous properties exhibited by the component oxides, e.g., high surface area and excellent high temperature stability, so that the combination coating demonstrates a combination of properties not demonstrated by either of the single oxides or by mixtures thereof. In addition, these layered coatings promote outstanding catalytic activity in base or noble metal catalysts supported thereby.

The support coatings disclosed, while amenable to deposition using conventional techniques known in the art, are preferably applied by a novel process which comprises impregnation of a coated or uncoated support structure with the alkoxides of the desired metal oxides, in situ hydrolysis of the alkoxide coating to form the hydrated metal oxides, and dehydration of the hydrous oxides to form a porous oxide coating. In addition to the expected advantage of purity, this process provides a uniform, tightly-bonded, integral coating of very high surface area on the support structure without the use of conventional bonding procedures.

DESCRIPTION OF THE PREFERRED EMBODIMENTS

Support structures to be coated according to the invention as described above may be selected from any of the well known types of ceramic, glass-ceramic, or glass structures employed in the prior art. However, from the standpoint of convenience, we prefer to employ monolithic ceramic or glass-ceramic structures which can provide relatively compact and efficient units for use in automobiles. Particularly preferred are refractory monolithic structures of the honeycomb type, described, for example, in U.S. Pat. No. 3,112,184 to Hollenbach, which are typically composed of refractory compounds selected from the group consisting of silica, alumina, zirconia, magnesia, cordierite, petalite, and spodumene. These structures demonstrate excellent thermal stability and have a high surface-to-volume ratio which enhances the efficiency of the catalytic unit.

It is known in the prior art in connection with the aforementioned refractory supporting structures to employ support coatings such as silica, alumina, zirconia, and the like to enhance and protect the activity of the catalyst. These coatings consist generally of pure or mixed oxides. Typically, such coatings are applied using binders or other means to form an adherent layer, or by decomposition of salts of the desired metal oxides which have been deposited from solutions onto the support structure.

We have now found that the surface area and porosity of oxide support coatings can be markedly improved if a method of alkoxide deposition and in situ hydrolysis is employed. Further, the thermal stability of such coatings in terms of the retention of surface area and porosity at high temperatures is as good or better than coatings prepared according to prior art methods. And finally, we have found distinctly improved catalytic activity when layered rather than pure oxide coatings are employed.

The preparation of an oxide coating through the use of our alkoxide deposition method involves the initial step of impregnating the selected support structure with an alkoxide of a metal oxide desired in the final coating. This impregnation is typically carried out by immersion of the structure into the molten or liquid alkoxide or solutions thereof, although other methods which will thoroughly coat the structure with the alkoxide may alternatively be employed. Suitable alkoxides include aluminum, titanium, tin, silicon, and zirconium alkoxides, and also alkoxy-substituted halides of the above metals, wherein the alkoxy groups contain from one to four carbon atoms and are readily hydrolyzable. Certain of these compounds are solids at room temperature, but these may be melted and applied to the support structure by immersion techniques or else dissolved in polar organic solvents, for example, the lower aliphatic alcohols such as ethanol or n-propanol, with impregnation being carried out by immersion in the solution. The liquid alkoxides may also be diluted with solvents, if desired. Examples of typical alkoxides are aluminum triisopropoxide, titanium tetraisopropoxide, titanium tetra-n-butoxide, zirconium tetra-n-propoxide, tin tetraethoxide, and silicon tetramethoxide.

The quantity of alkoxide retained on the support structure is, in part, a function of the porosity and roughness of the structure, but it may be controlled by controlling the viscosity of the immersion liquid through the use of the above solvents or, particularly in the case of the molten alkoxides, by controlling the temperature of the liquid and the monolith. Compatible refractory fillers such a silica, alumina, magnesia, and the like may be added to further increase retention by the structure, if desired.

Following the deposition of the alkoxides on the support structure, the alkoxides are hydrolyzed in situ according to a reaction generally characterized by the following equation:

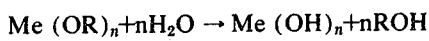

$$Me(OR)_n + nH_2O \rightarrow Me(OH)_n + nROH$$

wherein Me is an n-valent metal, OR is an alkoxide group of one to four carbon atoms, $Me(OH)_n$ is the desired hydrous oxide and ROH is the corresponding alcohol set free by the hydrolysis of the metal alkoxide. This hydrolysis produces a coating consisting of hydroxides, hydrated oxides or oxyhydrates of the selected metals. The hydrolysis may be carried out at room temperature with water, $NH_4OH$ or dilute acids, or with stream at temperatures above about 100°C, and pressures above about 14.7 psi. Steam hydrolysis is preferred, with typical treatments being carried out at about 120°C. and about 18 psi for periods of about 15 minutes to 2 hours. However, the exact temperatures and pressures are not critical and lower temperatures and pressures have given good results. Plunging into distilled $H_2O$ at room temperature for a time sufficient to hydrolyze the coating, typically a period of 15 minutes to several hours, also provides good results. Following the hydrolysis reaction, the coated structures are typically dried at 80°-120°C. to remove undesirable products of the hydrolysis, and they may then be fired to convert the hydrous oxide coating to a porous oxide coating, if desired.

Oxide coatings produced according to the described method are not only uniform and pure, but are also of very high surface area and good porosity. Alumina coatings prepared from aluminum isopropoxide gave surface area values of at least about 150 $m^2$/gram, as determined by nitrogen adsorption employing a standard BET method, and this was not appreciably diminished even after severe thermal aging at 900°C. in air for 24 hours. On the other hand, alumina coatings prepared from the decomposition of aluminum nitrates gave initially high surface area but deteriorated on heating at 900°C. for 24 hours to give values of about 50 $m^2$/gram. Steam hydrolyzed titanium and zirconium alkoxides gave surface areas of about 300 $m^2$/gram, but unfortunately these values are not thermally stable, and thermal treatment at 800°C. for 16 hours reduced the surface areas of these materials below about one square meter per gram.

While the described procedures are generally useful in the deposition of adherent, high-surface-area support coatings their principal utility lies in the preparation of our combination or layered coatings as catalyst supports. These novel combination coatings generally consist of at least two layers; a base layer characterized by a high, thermally stable surface area which may be composed of alumina, silica or mixtures thereof, and one or more surface layers differing in composition from the base layer composed of oxides selected from the group consisting of titania, zirconia, silica, tin oxide, and manganese oxide. Preferably, these combination coatings will comprise a base layer and from one to two surface layers. No two adjacent layers are of the same composition, but the coatings may comprise more than one layer of a given oxide or mixture. I have found that such layered coatings provide catalyst supports which are significantly better than single oxide coatings in terms of promoting catalytic activity and stability under adverse thermal conditions.

While the exact mechanism of promotion and stabilization has not been definitely ascertained, it is believed that the function of the base coating in providing a support of very high thermally-stable surface area for the covering layer or layers plays an important role. Either silica or alumina can perform this function, and mixtures of silica and alumina are useful in matching the thermal expansion of the base coating to that of the refractory support structure for better adherence during thermal cycling. Particularly useful combination coatings are $TiO_2$ on $Al_2O_3$, $ZrO_2$ on $Al_2O_3$, $SnO_2$ on $Al_2O_3$, $SiO_2$ on $Al_2O_3$, $Mn_3O_4$ on $Al_2O_3$, $TiO_2$ on $SiO_2$ and a three layer coating composed of $TiO_2$ on $ZrO_2$ on $Al_2O_3$.

The relative thickness of the layers comprising the layered support coatings of the invention are not critical. We have found that layers ranging in thickness from about 1–2 mils are quite suitable. Generally, the base layer may be as thick as desired, but thicknesses greater than about 5 mils are seldom required. In the case of the surface layers, thicknesses greater than 5 mils may tend to obscure the stabilizing and promoting effects of lower layers. Preferred layer thicknesses in the range from about 1–5 mils are determined mainly by the intended catalyst system and its method of application.

A suitable method of deposition of the disclosed layered support coatings comprises the sequential repetition of the process of alkoxide impregnation and in situ hydrolysis for each of the desired layers, so that a multiple-layered coating of hydrous oxides is formed. Optionally, each hydrous layer may be fired following hydrolysis but prior to deposition of a covering layer, as, for example, where it is desired to develop a particular pore size distribution in the support oxide. It is also possible to delay firing until the final hydrous oxide layer has been deposited.

Our preferred procedure for layered coatings comprises firing the base coating at temperatures in the range from about 300°–600°C. for a period of time in the range from about 1–24 hours prior to the deposition of the surface layer oxide. This firing step appears to produce a final coating which is somewhat more effective in enhancing the catalytic activity and stability of many known catalysts. Subsequently, the surface layers are applied by alkoxide impregnation and in situ hydrolysis, and these surface layers are then merely dried to remove water and alcohol hydrolysis byproducts, rather than fired to dehydrate the hydrous oxides. Catalysts may then be deposited directly on the hydrous oxide coating using any of the catalyst deposition procedures which are well known in the art, with dehydration of the entire system being carried out subsequent to catalyst deposition.

While best results have generally been obtained using an alkoxide hydrolysis method of depositing the layered support coatings of the invention, it is also possible to deposit such layered coatings by any of the other oxide deposition methods known in the art. For example, inorganic salt impregnation and decomposition, oxide precipitation from salt solutions, or even direct oxide bonding from oxide slurries would provide acceptable layered support coatings according to the invention.

In a few cases, alkoxide hydrolysis is, in fact, not the preferred method as, for example, where a manganese oxide covering layer is required. In that case we prefer a deposition method comprising impregnating the coated support structure with an inorganic manganese salt and precipitating very pure hydrous manganese oxide directly onto the structure by contact with concentrated ammonium hydroxide. This procedure comprises no part of the present invention, but is completely described and claimed in the co-pending application of G. F. Foster, H. E. Meissner, and J. L. Stiles, commonly assigned herewith, entitled "Process for Depositing Oxide Coatings," Briefly, the procedure is useful in the deposition of very pure oxides of 2, 3, 4 and 5 valent metals, including manganese, tin, and chrome, which form insoluble hydroxides even in the presence of excess $NH_4OH$. Inorganic salts such as the chlorides and nitrates of these metals are suitable starting materials, and impregnation of the coated or uncoated support structures is typically carried out by immersion in aqueous solutions of the selected salts. Precipitation of the hydroxide is then induced, typically by immersion in concentrated $NH_4OH$. Drying prior to precipitation is not desirable because coatings of inferior uniformity are produced as the result of salt migration during the evaporation process.

The surprising capability of the disclosed layered catalyst support coatings to enhance and stabilize the activity of known catalysts was discovered as the result of direct measurements of the catalytic activity of devices embodying combination coatings. The method of testing involved measurements of the efficiency of catalytic devices in converting carbon monoxide and unburned hydrocarbons present in a moving gas stream to carbon dioxide and water. The efficiency of most catalysts increases as the temperature in the reaction zone increases, but high efficiency at low or moderate temperatures is most important. The efficiency of each device is, therefore, judged on the basis of the reaction temperature required for conversion of 50% of the carbon monoxide and 50% of the unburned hydrocarbon present in the gas stream. Lower 50% conversion temperatures indicate greater catalytic efficiency and, hence, a more active catalyst.

The procedure employed for depositing catalysts on the support coatings of the invention is not critical; any of the well known catalyst deposition procedures are suitable. We prefer to employ a procedure wherein the catalyst is quantitatively adsorbed from a solution onto an oxide support in contact therewith, as is shown in detail in Examples I and II below. However, the procedure comprises no part of the present invention, being completely described and claimed in the copending application of G. F. Foster, H. E. Meissner, and J. L. Stiles, Ser. No. 243,416, entitled "Process for Depositing Noble Metal Catalysts," commonly assigned herewith.

To compare the effectiveness of different support coatings on catalytic activity and stability, groups of catalytic devices were prepared using the same basic support structures and the same catalysts in known concentrations, but having support coatings of differing compositions and/or configurations. Most of the testing was carried out using cylindrical monolithic support structures of the honeycomb type, about one inch in diameter and 2–5/16 inches in length, having a bulk volume of about 30 cubic centimeters and a plurality of longitudinal passages through which the gases to be treated are passed. For the purpose of support coating testing with oxidation catalysts, we employ a gas consisting of 250 ppm propylene, 1% CO, 1.25% $O_2$, 10% $H_2O$ vapor and the balance nitrogen by volume, which is passed through the samples at a space velocity of 15,000 hour$^{-1}$. The exiting gases are continuously monitored to determine the percent conversion of carbon monoxide and propylene to carbon dioxide and water. Supports for reduction catalysts are similarly tested using a similar gas mixture containing somewhat less oxygen and some NO.

It is well known that the activity of many widely used catalysts such as platinum and copper chromite is degraded by prolonged exposure to elevated temperatures, and experimental catalytic devices for automotive applications are routinely subjected to accelerated thermal aging at high temperatures to obtain data which is useful in estimating the probable service life of these devices. Our testing program, therefore, comprised two phases: an initial test run of samples to be compared in order to determine the catalytic activity of each device as a function of support coating composition and configuration, and a supplemental test run after subjecting the samples to an accelerated thermal aging treatment to estimate the expected service life of a sample, based on the stability of the catalyst-support coating system at high temperatures.

Alumina is one of the most commonly employed catalytic support materials, being utilized both in the form of a coating on monolithic catalyst support structures, and in the form of beads as the sole support material. A major advantage of alumina is its stability at high temperatures; catalysts deposited on alumina show only minor losses in activity upon accelerated thermal aging at 800°C. in air for 24 hours. This behavior is well illustrated by alumina-coated, platinum-bearing monoliths prepared by a process comprising impregnation of the monoliths with aluminum isopropoxide to form an isopropoxide coating, in situ hydrolysis of the isopropoxide at 120°C. in a steam atmosphere to convert the isopropoxide to the hydrous oxide, firing at 600°C. for 24 hours to convert the hydrous oxide to alumina, and deposition of a platinum catalyst comprising about 0.5% by weight of the coated monolith on the alumina coating. The platinum was deposited from a solution of chloroplatinic acid using conventional and well known procedures. Typically, such monoliths are capable of 50% conversion of the carbon monoxide and propylene in the aforementioned test gas stream at 440°C. and 460°F., respectively, while accelerated thermal degradation at 800°C. for 24 hours reduces this activity to about 490°F. and 490°F., respectively. While this result suggests that an alumina support coating might enhance the service life of a catalyst, the catalytic activity of the device is not as great as would be desired in an automotive system.

In contrast to the above-described alumina coatings, titania and zirconia support coatings prepared, for example, by the in situ steam hydrolysis of titanium isopropoxide or zirconium tetra-n-propoxide are very effective in ehancing the activity of a platinum catalyst. Devices prepared with titania and zirconia support coatings, employing procedures identical to the procedure outlined above for alumina support coatings, demonstrate a much higher level of catalytic activity when identical platinum catalyst loadings are used. Typical 50% conversion values for carbon monoxide and propylene are 340°F. and 350°F., respectively for the zirconia-supported catalyst and 360°F. and 425°F. for the titania-supported catalyst. Unfortunately, accelerated thermal aging at 800°C. in air for 24 hours indicates that titania- and zirconia-supported catalysts might be expected to encounter service life problems, since the activity of the titania-supported catalyst typically degrades to 775°F. and 775°F., respectively, for 50% conversion of carbon monoxide and propylene, while the efficiency of the zirconia-supported catalyst degrades to 580°F. and 580°F., respectively.

Layered support coatings comprising a base layer of alumina and a covering layer of zirconia prepared by a process comprising impregnating a support structure with alumina isopropoxide to form an alkoxide layer, steam hydrolyzing the alkoxide layer in situ to form a layer of hydrous alumina, impregnating the hydrous alumina coating with a solution of zirconium tetra-n-propoxide in n-propanol (75% by weight alkoxide), hydrolyzing to form a covering layer of hydrous zirconia on the layer of hydrous alumina and, finally, firing the layered coating of hydrous oxides at 600°C. for 24 hours to form a layered oxide coating, are found to provide greater stability than zirconia coatings without sacrificing the excellent catalytic activity demonstrated thereby. Typical devices embodying layered support coatings, wherein the base alumina layer comprises about 5–12% by weight of the coated structure, the covering zirconia layer about 5–12% by weight of the coated support structure and the platinum catalyst only about 0.2% by weight of the coated support structure, are capable of converting 50% of the carbon monoxide and 50% of the propylene in the test gas stream at temperatures of 360°F. and 370°F., respectively, notwithstanding the low platinum loading. Further, accelerated thermal aging at 800°C. for 24 hours in air reduces these 50% conversion values to only about 530°F. for carbon monoxide and 530°F. for propylene. This layered coating is, therefore, significantly better than zirconia in terms of stability and much better than alumina in enhancing catalytic activity.

Example I below describes in detail the preparation of such a catalytic device having an alumina-zirconia layered support coating according to the method of the present invention.

EXAMPLE I

A cylindrical refractory support structure one inch in diameter and 2–5/16 inches in length with a honeycomb configuration comprising about 250 longitudinal passages or cells per square inch of frontal surface area is obtained. The structure is composed of sintered cordierite having a porosity of about 35%. The sample is freed of loose particulate matter by blowing out with an air stream. The weight of the sample is 17.69 grams. After drying for 1 hour at 120°C., it is impregnated by repeatedly dipping into molten aluminum triisopropoxide, with the temperature of the melt being maintained at about 120°C. Excess liquid is drained from the cells, then further removed by shaking. After about 5–10 minutes at ambient temperatures, the sample is placed into a hospital-type steam-sterilizing unit and subjected to steam at about 120°C. and 18 psi for 30 minutes. Then it is removed and fired at 400°C. in air for 24 hours. A weight gain of 1.49 grams of alumina is registered.

In order to apply a layer of hydrous zirconia on top of the alumina coating, the sample is immersed repeatedly in a 75 weight percent solution of zirconium tetra-n-propoxide in n-propanol at room temperature, removing excess solution by shaking out to prevent the plugging of sample cells. The above-described steam-treatment is then repeated to convert the zirconium alkoxide into hydrous zirconia of the approximate composition [$ZrO_2 \cdot 2H_2O$]. A weight increase of 1.73 grams due to the zirconia coating is observed.

An alkaline solution containing 0.040 grams of Pt is prepared by weighing out 0.0909 gram of $(NH_4)_2PtCl_6$ and dissolving it in an aqueous solution of $NH_4OH$ (1 part $NH_4OH$ to 4 parts $H_2O$ by weight) to make 27.5 ccs of solution. This solution is permitted to digest at 80°–90°C. in a covered container for 4 hours. Meanwhile, the sample is kept in contact with a solution of concentrated $NH_4OH$ (1 part $NH_4OH$ to 1 part $H_2O$ by weight) for 24 hours at room temperature. The sample is then removed from the concentrated $NH_4OH$, immersed in the above Pt-catalyst solution at room temperature, and kept there for 24 hours. This procedure insures virtually quantitative adsorption of complexed Pt ions on the coating surface, corresponding to about 0.2% Pt by weight based on the total sample weight. The sample is then stripped of depleted catalyst solution by repeated submersion in distilled water, and dried for 3 hours at 120°C. Subsequently, it is furnace-heated in a vacuum to 300°C. at the furnace heating rate and kept at that temperature in the vacuum for 1 hour. A mixture of 90% $N_2$ and 10% $H_2$ is then introduced into the furnace, and the Pt-catalyst is reduced in this flowing gas stream for one hour at 300°C. Thereafter, the gas stream is interrupted and the sample is allowed to cool to room temperature.

This prepared sample demonstrates a high degree of catalytic activity. Results for 50% conversion of propylene and CO are found to be 360°F. and 340°F., respectively for the asprepared sample, and 530°F. and 530°F., respectively after aging in air at 800°C. for 24 hours.

A layered oxide coating prepared as above-described is found to be superior to a similarly-prepared mixed oxide coating in terms of activity enhancement and stability. For example, a typical device embodying an equimolar $Al_2O_3 \cdot ZrO_2$ mixed oxide coating, prepared from a mixture of aluminum and zirconium alkoxides exactly according to the procedure outlined above for preparing an alumina coating from aluminum isopropoxide, and bearing 0.2% by weight of a platinum catalyst, converts 50% of the available carbon monoxide and 50% of the available propylene in the test gas stream at 390°F. and 450°F. Furthermore, such a device typically degrades more severely upon accelerated thermal aging than does a device embodying a platinum catalyst supported on pure zirconia.

The advantages of layered coatings are not limited to the $Al_2O_3$—$ZrO_2$ system alone. Layered coatings comprising a base layer of alumina and a covering layer of manganese oxide are of particular interest as supports for platinum catalysts and other noble metals because they stabilize catalytic activity even to a greater degree than pure alumina as evidenced by accelerated thermal aging tests. Initial activities for this system ranged between about 400°F. to about 430°F. for 50% conversion of both CO and propylene, and this activity decreased only about 30°F. to 50°F. after thermal degradation.

Example II below describes in detail the preparation of a catalytic device in this system according to the present invention.

EXAMPLE II

A refractory support structure similar to the one in Example I, weighing 16.61 grams, is coated with a layer of alumina substantially as described in Example I, except that it is heated to 600°C. for 24 hours following the steam hydrolysis treatment. This alumina coating produces a 1.69 gram increase in sample weight.

To apply a coating a manganese oxide, the sample is dipped repeatedly in a solution prepared by mixing 20.6 grams of a commercially-obtained manganous nitrate solution (50% $Mn(NO_3)_2$ by weight) with 34.7 grams of $H_2O$, draining the excess solution out of the sample cells and shaking out. The impregnated support structure is then treated to cause the precipitation of $Mn(OH)_2$ in situ by immersing it in concentrated $NH_4OH$ (1 part $NH_4OH$ to 1 part $H_2O$ by weight). The sample is then dried in air at 80°C. for 3 hours, thus oxidizing the initially-precipitated manganous hydroxide to a mixture predominantly containing higher-valent hydrous manganese oxides. Without further treatment the sample is then contacted at room temperature with an alkaline platinum amine solution which is prepared as described in detail in Example I, again containing 0.040 grams of Pt in 27.5 ccs of solution. The platinum is then deposited by quantitative adsorption from the solution, drying, and firing exactly as described in Example I.

The sample prepared as described above is found to demonstraté excellent catalytic activity and stability. Initial values for 50% conversion of propylene and carbon monoxide of 485°F. and 450°F. respectively are found to change only insignificantly after accelerated aging at 800°C. in air for 24 hours to 475°F. and 475°F., respectively.

The activity of palladium catalysts is also enhanced by layered coatings. Palladium normally does not present a degradation problem, perhaps because PdO appears to be as effective a catalyst as Pd itself for the conversion of carbon monoxide and hydrocarbons to carbon dioxide and water. However, the activity of palladium to catalize these reactions is improved through the use of layered oxide rather than single oxide coatings. For example, a device comprising 0.5% by weight of palladium on an alumina coating prepared from alkoxides as above described converts 50% of the available carbon dioxide and 50% of the propylene in a test gas stream to $CO_2$ and $H_2O$ at temperatures of 400°F. and 430°F., respectively. On the other hand, a catalytic device embodying a layered support coating comprising a base layer of alumina and a covering layer of titania bearing a palladium catalyst comprising 0.5% by weight of the device typically exhibits corresponding 50% conversion temperatures of 360°F. for carbon monoxide and 360°F. for propylene. Also, a catalytic device embodying a layered support coating comprising a base layer of alumina, an intermediate layer of zirconia and a covering layer of titania bearing a palladium catalyst comprising only about 0.2% by weight of the device typically exhibits 50% conversion efficiency for carbon monoxide and propylene of 350°F. and 370°F., respectively. Thus, the disclosed layered coatings substantially enhance the activity of palladium catalysts.

Layered coatings comprising a base layer of alumina and a covering layer of either $SnO_2$ or $ZrO_2$, and also coatings comprising a base layer of mixed alumina and silica and a covering layer of $SnO_2$, are particularly suitable for supporting catalysts comprising platinum, iridium, rhodium, and ruthenium which are useful in treating waste gases to remove the oxides of nitrogen therein. Methods for utilizing certain specific catalysts in combination with certain layered supports to treat waste gases containing the oxides of nitrogen are described and claimed in the copending application of G. F. Foster, H. E. Meissner, and J. L. Stiles, Ser. No. 243,255, entitled "Catalyst Systems for the Reduction of the Oxides of Nitrogen," filed concurrently herewith and assigned to the assignee of the present invention.

Many base metal catalysts such as copper, nickel, cobalt, manganese, and iron chromites, manganese, nickel, cobalt, and copper ferrites, and nickel, cobalt, iron, and copper oxides are intrinsically less active for the conversion of carbon monoxide and hydrocarbons to carbon dioxide and water than are noble metal catalysts, and, therefore, higher catalysts loadings are required in automotive catalyst systems. However, layered coatings are nevertheless effective to enhance and stabilize the activity of many of these base metal catalysts, and are particularly suited for use with copper chromite catalysts to be employed in the treatment of automotive exhaust gases.

For the purpose of our investigations into the desirability of various support coating systems for use as base metal catalyst supports, we employed copper chromite catalytic coatings deposited from aqueous solutions of copper and chrome nitrates using well known procedures comprising impregnation of the coated support structure with concentrated aqueous solutions of copper nitrate and chrome nitrate, removal of the excess solution, drying, and finally firing at 600°C. for about three hours to decompose the nitrates and develop a catalytically-active copper chromite phase. For purposes of comparison, catalyst loadings were held constant at a value in the range from about 6–12% by weight of the coated catalytic device in the case of monoliths. In addition, however, alumina beads coated with the disclosed support coatings and supporting up to about 10% by weight of a copper chromite catalyst were investigated and found to perform satisfactorily.

Conversion tests of copper chromite catalysts on monolithic alumina-coated devices wherein the alumina coating is prepared by deposition and in situ hydrolysis of aluminum alkoxides as hereinbefore described indicate that 50% conversion of carbon monoxide typically occurs at 450°F. and 50% conversion of propylene at 650°F. Accelerated thermal aging at 800°C. for 24 hours in air reduces these 50% conversion values to 550°F. and 725°F., respectively. Copper chromite-bearing devices embodying layered support coatings such as, for example, coatings comprising a base layer of alumina and a surface layer of titania prepared as hereinbefore described, typically convert 50% of the available carbon monoxide and 50% of the available propylene at temperatures of 350°F. and 620°F., respectively. After accelerated thermal aging at 800°C., for 24 hours in air, these devices still demonstrate 50% conversion efficiencies for carbon monoxide and propylene in the ranges of 500°–520°F. and 630°–670°F., respectively. Thus, the layered support coatings of the invention also provide a means for improving the activity and stability of base metal catalysts.

Example III below describes in detail the procedure by which a device embodying a layered support coating and a copper chromite catalyst may be prepared according to the method of the present invention.

EXAMPLE III

A sample of the same dimensions as employed in Example I, but composed of a sintered, hightly-refractory, titanium-aluminum-silicate glass-ceramic material with about 360 cells per square inch, having about 35% open porosity and weighing about 20.40 grams, is impregnated with molten aluminum triisopropoxide and hydrolyzed in a steam atmosphere according to Example I. This procedure is repeated once. Then, the sample is heated to 600°C. for 24 hours in air. A weight increase of 2.58 grams is observed to result from this treatment.

A coating of hydrous titania, of the approximate composition $[TiO_2 \cdot H_2O]$ is then deposited on top of the alumina coating by impregnating the sample with liquid titanium tetraisopropoxide at room temperature, and then steam hydrolyzing for 30 minutes as in Example I. After repeating this coating procedure once, a weight gain of 3.52 grams due to the hydrous titania layer is observed.

The sample is then impregnated at room temperature with a solution prepared by mixing 52 grams of $Cr(NO_3)_3 \cdot 9H_2O$, 28 grams of $Cu(NO_3)_2 \cdot 3H_2O$ and 20 grams of $H_2O$ at about 60°C. The impregnation is carried out in a vacuum for 30 minutes, but the vacuum is periodically released by admitting air for about one minute at 10 minute intervals. After the excess solution is shaken out of the sample, it is transferred to a drying oven at 80°C. and held at this temperature for 2 hours. A catalytically-active copper chromite phase having a $CuO:Cr_2O_3$ ratio of 1.8:1 is then developed by decomposing the impregnated nitrate precursors with a firing treatment at 600°C. for 3 hours. The foregoing deposition procedure results in a sample weight increase of 1.11 grams. Taking the loss of $H_2O$ from the hydrous titania coating into consideration, this corresponds to approximately 1.70 grams of copper chromite, or about 6.1 percent of the total sample weight.

The initial catalytic activity, expressed in terms of the observed 50% conversion temperatures for propylene and carbon monoxide, is 620°F. and 335°F., respectively; this degrades after thermal aging at 800°C. for 24 hours in air to 650°F. and 490°F., respectively. These results represent a significant improvement in activity and stability over conventionally-supported copper chromite catalysts.

From data of the kind described above, we have concluded that the catalytic activity and stability of many commmonly-used base and noble metal catalysts is strongly affected by the nature of the support material employed. We have further concluded that the layered combination coatings of the present invention, and the methods for producing them described herein, enhance and preserve the activity of many known catalysts, and, therefore, provide useful tools for the production of efficient and durable catalytic units in many different kinds of supported catalyst systems.

We claim:

1. A catalytic device comprising a refractory support structure, a refractory metal oxide catalyst support coating covering at least a portion of said support structure, and a catalyst supported on said support coating, wherein the catalyst support coating consists of a multi-layer oxide coating of at least two layers which comprises a base layer and at least one covering layer differing in composition from said base layer, said base layer consisting of silica, alumina, and mixtures thereof, and each of said covering layers consisting essentially of an oxide selected from the group consisting of silica, titania, zirconia, tin oxide and manganese oxide.

2. A device according to claim 1 wherein the catalyst support coating comprises a base layer and from one to two covering layers.

3. A device according to claim 2 wherein the refractory support structure is a monolithic honeycomb structure composed principally of refractory compounds selected from the group consisting of silica, alumina, zirconia, magnesia, petalite, cordierite and spodumene.

4. A device according to claim 3 wherein the catalyst support coating comprises a base layer of alumina and a single covering layer of an oxide selected from the group consisting of titania, silica, zirconia, tin oxide and manganese oxide.

5. A device according to claim 3 wherein the catalyst support coating comprises a base layer of alumina, a first covering layer of zirconia and a second covering layer of titania.

6. A device according to claim 3 wherein the catalyst is a noble metal selected from the group consisting of platinum, palladium, rhodium, iridium, ruthenium and mixtures thereof.

7. A device according to claim 3 wherein the catalyst is a base metal catalyst selected from the group consisting of transition metal oxides, chromites and ferrites.

8. A device according to claim 7 wherein the base metal catalyst is copper chromite.

9. In a catalytic device comprising a refractory support structure, a catalyst support coating covering at least a portion of said structure, and a catalyst supported on said support coating, the improvement which comprises, in place of the catalyst support coating a multi-layer catalyst support coating of at least two layers comprising a base layer and from one to two covering layers differing in composition from said base layer, said base layer consisting essentially of oxides selected from the group consisting of alumina, silica and mixtures thereof, and each of said surface layers consisting essentially of an oxide selected from the group consisting of silica, titania, zirconia, tin oxide and manganese oxide.

10. A process for depositing a multi-layer catalyst support coating of at least two layers on a refractory support structure which comprises:

a. coating the refractory support structure with the alkoxides of at least one metal selected from the group consisting of silicon and aluminum to form a base layer thereon, said alkoxides having alkoxy groups which contain from one to four carbon atoms and which are readily hydrolyzable;

b. hydrolyzing the base layer in situ on the refractory support structure to convert said alkoxides to the hydrous oxides of the selected metals;

c. firing the hydrous oxide base layer at a temperature in the range of about 300°–600°C. for about 1–24 hours to dehydrate the base layer; and d. providing on the base layer at least one oxide surface layer differing in composition from said base layer, said oxide surface layer being composed of an oxide selected from the group consisting of silica, titania, zirconia, tin oxide and manganese oxide.

11. A process according to claim 10 wherein the lower alkoxides are selected from the group consisting of aluminum triisopropoxide and silicon tetramethoxide.

12. A process according to claim 10 wherein the hydrolysis of the base layer in situ is carried out by contact with steam at a temperature of at least about 100°C. and a pressure of at least about 14.7 psi.

13. A process according to claim 10 wherein the hydrolysis of the base layer in situ is carried out by contact with a liquid selected from the group consisting of water and aqueous solutions of ammonium hydroxide.

* * * * *